United States Patent
Ling et al.

(10) Patent No.: US 6,172,970 B1
(45) Date of Patent: Jan. 9, 2001

(54) LOW-COMPLEXITY ANTENNA DIVERSITY RECEIVER

(75) Inventors: Curtis Chih-Shan Ling, Kowloon (HK); Justin C-I. Chuang, Holmdel, NJ (US); Zhang Chunning, Clear Water Bay (HK)

(73) Assignee: The Hong Kong University of Science and Technology (HK)

( * ) Notice: Under 35 U.S.C. 154(b), the term of this patent shall be extended for 0 days.

(21) Appl. No.: 08/851,543

(22) Filed: May 5, 1997

(51) Int. Cl.[7] ................................. H04J 3/02; H04L 1/02
(52) U.S. Cl. ................. 370/347; 375/347; 455/277.2
(58) Field of Search ......................... 370/347, 321; 375/345, 346, 347, 348, 349, 366; 455/133, 134, 135, 136, 137, 138, 139, 277.1, 277.2, 278.1, 273, 276.1, 304, 101, 67.1, 67.2, 67.3, 226.1–226.3

(56) References Cited

U.S. PATENT DOCUMENTS

| | | | |
|---|---|---|---|
| 3,934,204 | * | 1/1976 | Hill ........................................ 455/138 |
| 4,450,585 | * | 5/1984 | Bell ........................................ 455/135 |
| 4,972,434 | * | 11/1990 | Le Polozec et al. ................. 375/347 |
| 5,031,193 | * | 7/1991 | Akinson et al. ...................... 375/347 |
| 5,203,024 | * | 4/1993 | Yamao ................................. 455/277.1 |
| 5,263,180 | * | 11/1993 | Hiramaya et al. .................... 455/139 |
| 5,390,166 | * | 2/1995 | Rohani et al. ......................... 455/137 |
| 5,530,926 | * | 6/1996 | Rozanski ................................ 370/347 |
| 5,796,777 | * | 7/1998 | Terlep et al. .......................... 455/67.1 |

* cited by examiner

Primary Examiner—Chi H. Pham
Assistant Examiner—Steven Nguyen
(74) Attorney, Agent, or Firm—Burns, Doane, Swecker & Mathis, L.L.P.

(57) ABSTRACT

A low-diversity antenna diversity receiver suitable for TDMA PCS handset implementation employing two diversity branches. The receiver is capable of selecting a diversity scheme which is anticipated to give optimum signal reception among a plurality of diversity schemes installed on the receiver. This receiver, more conveniently termed multi-diversity receiver comprises a single conventional wireless digital receiver chain augmented with a few additional low-cost passive RF components and minor control circuits. A plurality of diversity algorithms, for example, selection diversity (SD), equal-gain combining (EGC) or interference-reduction combining (IRC) scheme, which are suitable for implementing on this multi-diversity receiver are also described. Simulation results showing performance of this multi-diversity receiver are also presented.

16 Claims, 5 Drawing Sheets

BLOCK DIAGRAM OF THE TWO-BRANCH ANTENNA MULTI-DIVERSITY RECEIVER.

FIG. 1

PACS DOWNLINK FRAME STRUCTURE

SYNCH: SYNCHRONOUS BITS   SC: SYSTEM CONTROL AND SUPERVISORY BITS   FC: FAST CHANNEL DATA
CRC: ERROR DETECTION      PC: POWER CONTROL

LOW-COMPLEXITY ANTENNA DIVERSITY RECEIVER

FIELD OF THE INVENTION

The present invention relates to an antenna diversity receiver for radio communication systems, and more particularly to a low-complexity antenna diversity receiver having implemented on a single receiver unit a plurality of inter-switchable diversity schemes. Furthermore, this invention relates particularly to an antenna diversity receiver especially suitable for use as a portable handset for Personal Communication Systems (PCS), such as Time Domain Multiple Access (TDMA) Communication Systems.

BACKGROUND OF THE INVENTION

It is well known that antenna diversity can improve the reception quality of communications in a wireless environment and yield increased system capacity. Conventionally, selection diversity is the simplest diversity scheme which operates on the principle of selecting the antenna diversity branch which provides the strongest received signal level or the best eye-opening. However, it is known that selection diversity does not provide any useful gain in a line-of-sight (LOS) environment since the two branches are correlated.

In a recent paper by Cox and Wong, "Low-Complexity Diversity Combining Algorithm and Circuit Architectures for Co-channel Interference Cancellation and Frequency Selective Fading Mitigation", *IEEE Trans. Comm. Vol*, 44, no 9, pp. 1107–1116, September 1996, it is shown that two antenna optimum-combining diversity produces a signal-to-interference ratio (SIR) improvement of at least 3-dB over conventional two-antenna selection diversity in Personal Access Communication Systems (PACS). This is attractive since combining diversity can be applied to cancel co-channel interference and boost the desired signal even in an LOS environment.

Qualitatively speaking, in an LOS environment, an optimum-combining receiver adjusts the joint signal of a plurality of antennas, resulting in an adaptive joint antenna pattern or polarization which attenuates co-channel interference while amplifying the desired signal. In a multi-path environment, the antennas may be receiving signals from separate paths and this picture is not entirely applicable, but the concept is the same.

While optimum-combining diversity offers attractive performance improvement over selection diversity, it is noticed that existing antenna diversity researches concentrate on selection diversity. Such a preference is probably due to that fact that many of the so-called adaptive antenna array solutions rely on algorithms which require well characterised antenna patterns. In contrast, most mobile PCS handset antennas possess patterns which are not carefully controlled and are quite dependent on the position of the antenna with respect to the user's hand and head. Thus, if optimum-combining diversity is to be devised and implemented on mobile PCS receiver handsets, the first task would be to seek optimum-combining diversity algorithms which do not require well characterised antennas as a prerequisite.

Hitherto, system complexity together with the associated power consumption, cost and size has been a significant barrier to the wide-spread commercial implementation of diversity schemes in PCS portable handsets since most proposed diversity handset schemes require one receiver chain for each branch of diversity which means that receiver circuitry from RF to baseband has to be duplicated. This dual receiver chain design approach is contradictory to the industrial trend of circuit simplification and consumer appetite of miniaturisation and cost reduction. This limitation, unless circumvented, would continue to hinder implementation and further development of diversity schemes in mobile handsets.

In the Cox & Wong publication above, there is shown a symbolic diagram, i.e. FIG. 1, which discloses the concept of a simplified ideal diversity receiver design in which the RF signal from two antenna branches are combined after level adjustment but before further processing presumably by a single channel device for baseband processing. However, this disclosure merely shows a future receiver topology hopefully to be implemented but the underlying algorithm proposed in that publication does not actually support implementation of a diversity receiver using single channel baseband signal processing.

Furthermore, while selection diversity algorithm does not offer significant signal quality improvement in the circumstances mentioned above, it is nevertheless very fast and energy efficient. In circumstances where the signal quality received by one of the antennas is superbly high, selection diversity would be beneficial and it would be highly desirable that the simpler selection diversity can be chosen and utilised. Thus, it would be highly desirable if a diversity receiver handset can accommodate a number of modes of diversity algorithms which can be chosen according to the reception conditions. This would of course require the presupposition that the prime constraints of low-cost, low-complexity and low-weight are observed.

SUMMARY OF THE INVENTION

It is therefore an object of the present invention to provide a low-complexity antenna diversity receiver design consistent with the prime design constraints, i.e. low-cost, low-complexity and low-weight, which is particularly suitable for handset implementation in PCS. To be implemented as a practical and sophisticated mobile PCS handset, it would be appreciated that the design has to meet the following practical design constraints:—

Firstly, the design should utilise only a single receiver chain and baseband combining processor together with standard baseband processing techniques.

Secondly, the only additional RF frontend components required are low-cost passive components for combining RF signals received through a plurality of antenna branches at the RF front-end.

Thirdly, the system is sufficiently robust to handle poorly-defined, user dependent antenna patterns.

Fourthly, the system is capable of providing several modes of diversity algorithm on single receiver without physically changing the hardware or baseband processing, and can choose the most appropriate diversity mode given the mobile usage and signal environment. For convenience, such a receiver would be referred hereinafter to as "multi-diversity receiver".

Finally, the techniques can be applied to an increased number of antennas, though at the cost of decreased mobility and lower tolerance to fading.

According to the present invention, there is therefore provided A portable receiver for time division multiplexing access (TDMA) personal communication systems in which a wanted signal burst and a plurality of unwanted signal bursts are transmitted in a time-multiplexed manner within the same signal frame comprising first and second antenna diversity branches, signal combining means and signal processing means, wherein each said antenna diversity branch comprises a low-noise amplifier and means for signal amplitude variation and one of said diversity branches comprises phase shifting means; said signal combining means is adapted to combine the signal outputs from said first and second diversity branches before said signal outputs have undergone any frequency conversion, and said signal processing means is adapted to process the signal output from said signal combining means.

Preferably, the receiver further comprises controlling means, wherein said controlling means is adapted to control said means for signal amplitude variation and said means for adjusting phase shift, the amount of amplitude to be varied and the phase to be shifted being dependent on the signal quality (SQ) of unwanted signal bursts which were respectively received by said first and second diversity branches.

Preferably, said signal quality is a factor indicating the eye-opening of the received unwanted signal bursts and is preferably determined by using a square-law symbol timing Preferably, wherein said receiver comprises means to select a diversity scheme among a plurality of diversity schemes comprising selection diversity (SD), equal-gain combining (EGC) and interference-reduction combining (IRC) algorithms.

According to another aspect of the present invention, there is described a portable receiver for time division multiplexing access (TDMA) personal communication systems in which a wanted signal burst and a plurality of unwanted signal bursts are transmitted in a time-multiplexed manner within the same signal frame comprising first and second antenna diversity branches, signal combining means, signal processing means and controlling means, wherein each said antenna diversity branch comprises a low-noise amplifier and means for signal amplitude variation and one of said diversity branches comprises phase shifting means; said signal combining means is adapted to receive and combine the signal outputs from said first and second diversity branches, said signal processing means is adapted to process the signal output from said signal combining means, and said controlling means is adapted to control said means for signal amplitude variation and said means for adjusting phase shift, the amount of amplitude to be varied and the phase to be shifted being dependent on the signal quality (SQ) of unwanted signal bursts which were respectively received by said first and second diversity branches.

In yet another aspect of the present invention, there is also described an algorithm for operating an antenna diversity receiver comprising i) determining the signal quality of said first and second diversity branches using unwanted signal bursts by firstly enabling said first and substantially disabling said second branch, ii) measuring the first signal quality of the burst received by first branch, secondly by enabling said second branch and substantially disabling said first branch, measuring the second signal quality of the burst received by second branch; iii) comparing the signal qualities thus measured against a pre-determined threshold value, selecting selection diversity if either of said signal qualities exceeds said threshold value and selecting combining diversity if the signal qualities of the signals or their combination are below the threshold value but above a second predefined threshold value which corresponds to signal which are too poor for demodulation, and iv) searching for better signal if the signal qualities of the signals and their combination are below the threshold value which corresponds to signal which are too poor for demodulation.

BRIEF DESCRIPTION OF THE DRAWINGS

The present invention will now be explained and illustrated in better detail by way of examples only and with reference to the accompanying figures, in which:—

DETAILED DESCRIPTION OF THE PREFERRED EMBODIMENT

The preferred embodiment of the present invention is a two-antenna multi-diversity receiver system having implemented a plurality of inter-switchable diversity modes, including selection diversity ("SD"), equal-gain combining ("EGC") and interference-reduction combining ("IRC"). The expression "multi-diversity" used in the present context is merely intended to indicate a receiver pedigree which is characterised by its ability to select a diversity algorism or scheme among a plurality of pre-installed diversity algorithms or schemes. The hardware of this system is only marginally more complex than existing non-diversity receivers and its complexity is quite comparable to that of a receiver implementing only selection diversity, while achieving performance comparable to that offered by more complex systems under quasi-static multi-path channel and interference conditions.

Hardware

Figure 1:
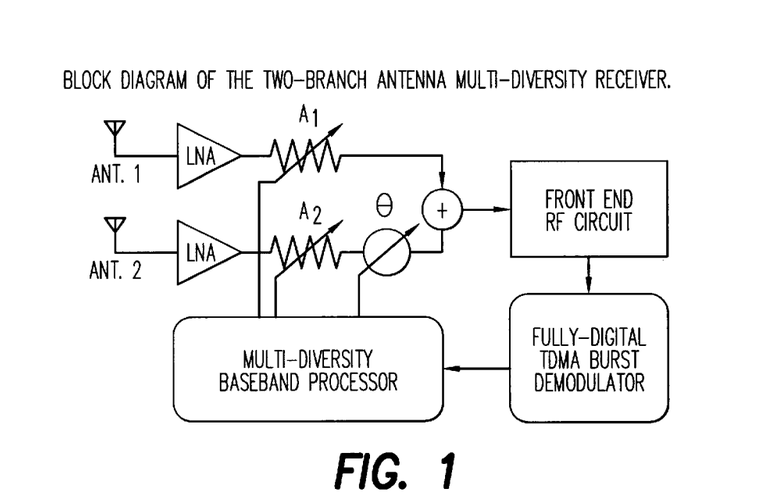
FIG. 1 is a block diagram showing a two-antenna branch multi-diversity receiver.

The multi-diversity receiver shown in FIG. 1 comprises two antennas, Ant.1 & Ant.2, each followed by a low-noise RF amplifier (LNA). Conventional antennas meeting the spatial or polarization diversity requirements (un-correlated in a multipath environment) and conventional low-noise RF amplifiers meeting pre-determined performance criteria or technical specifications would be suitable for used. The amplified signals, after appropriate amplitude adjustment and phase shifting, for example by a pair of controllable variable signal attenuators and a phase-shifter, is combined into a single signal stream by an RF-combiner. The signal stream thus combined is then processed by a front-end RF circuit which down-converts the RF-signal so that it can be processed by a demodulator and further operated on by a baseband processor which would in turn control the amplitude attenuators and the phase shifter.

The most noticeable extra hardware components which are to be added to a conventional selection diversity receiver system in order to convert the same into a multi-diversity receiver are two RF attenuators, a RF phase-shifter, and an RF signal combiner. Voltage-controlled variable RF-attenuators having attenuation range between 0–20 dB and a voltage-controlled RF phase-shifter having a shifting range of 0–360 degrees are selected for the present embodiment for illustration purposes and convenience only. Other types of attenuator or shifter with the appropriate ranges can of course be used.

Referring to FIG. 1, a variable RF attenuator is placed after the LNA in each diversity branch for relative amplitude scaling, introducing a maximum possible amplitude variation of 40 dB across the two branches. The phase shifter is only required in one of the two diversity branches to introduce relative phase shifting between the signal streams in the two branches. The resulting signals, after attenuation, phase shift or a combination thereof, are then summed at the signal combiner, fed into the RF front-end circuit for down-conversion and then to be processed by the baseband processor which in turn controls the variable attenuators and the phase shifter via some conventional interfaces.

Fully-Digital TDMA Burst Demodulator

For ease of understanding and because of the importance of TDMA systems in current PCS, the preferred embodiment of multi-diversity receiver architecture is explained with reference to a receiver which is compatible to and designed to operate under TDMA environment for PCS communications, such as PACS, WACS, GSM, PHS, DECT and other like systems. However, it should also be appreciated that the present receiver methodologies, concepts and topologies would equally be applicable for performance improvements of any PCS systems, such as direct-sequence or frequency-hopped systems, as well as TDMA systems.

Figure 2:
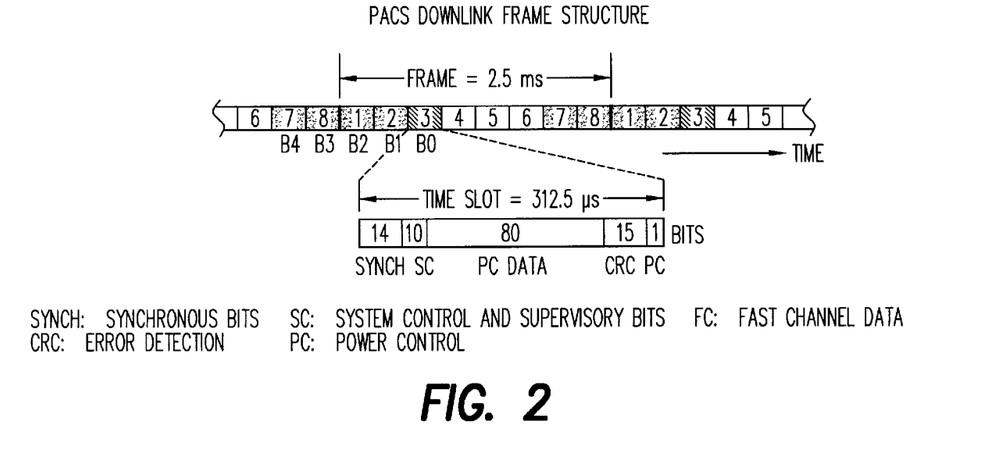
FIG. 2 shows a typical TDMA signal frame structure conforming to PACS standard for PCS communication.

For sake of completeness and clarity, some basic parameters of the selected TDMA environment together with a preferred demodulation technique are now described. The example transmission environment selected for the present illustrative purposes is the US low-tier PACS standard using $\pi/4$ DQPSK modulation, with 384 kbps channel bit rate, 120 bits per time slot, 8 time slots (bursts) per frame, 312.5 $\mu$s burst duration and 2.5 ms frame duration, i.e. a frame rate of 400 Hz. The PACS signal downlink frame structure of this system is shown in FIG. 2. In this example implementation, $\pi/4$ DQPSK modulation and square-root raised cosine ($\alpha$=0.5) pulse shaping is used. The receiver also uses two square root raised cosine ($\alpha$=0.5) filters for in-phase (I) and quadrature (Q) baseband signal to match the transmitter for optimal performance in additive white Gaussian Noise (AWGN) environments. It also follows that other digital phase modulation systems can be treated similarly.

The preferred signal demodulation technique which is adopted in the instant system for explanation purposes is the fully digital coherent demodulation technique proposed by Chuang and Sollenberger in "Burst Coherent Demodulation with Combined Symbol timing, Frequency Offset Estimation, and Diversity Selection", *IEEE Trans. On Communication,* Vol. 39, no. 7 July 1991, and in "Low-overhead Symbol Timing and Carrier Recovery for TDMA portable Radio Systems", *IEEE Trans. On Communication,* vol. 38, no. 10, pp. 1886–92, October 1990.

This coherent demodulation technique is unique and preferred because it jointly estimates both symbol timing and carrier frequency offset by operating on an individual TDMA burst without requiring a training sequence. These estimates produce a signal quality factor (SQ) measurement which is a good indicator of the degree of signal impairment caused by noise, delay spread or interference which closes the eye-opening of the detected signals. Unlike using the maximum average eye-opening as symbol timing as suggested in the above Chuang and Sollenberger paper of 1991, square-law symbol timing scheme as proposed by J. G. Proakis in his book "Digital Communications", $3^{rd}$ ed., New York, McGraw-Hill, 1995, is used to estimate timing because of its superior performance. The values of I and Q thus obtained at the sampling output are then used to calculate the SQ and carrier phase ($\phi$). A novel low-complexity diversity combining processor is added into the receiver to control the combining circuits. At the same time, the signal strength is measured through received signal strength indicator (RSSI) circuits.

A low IF bandpass signal at 768 kHz (4 times the symbol rate) is sampled with an A/D converter at 3.072 MHz (4 times the IF), resulting in an oversample of 16 samples per symbol. This is required to achieve symbol timing recovery, signal quality measure, frequency offset estimation and carrier phase recovery without overhead, as suggested in the Chuang and Sollenberger paper above. With the same down-converter architecture, coherent and differential detection can be achieved for $\pi/4$ DQPSK.

While frequency offset estimation is not addressed in this implementation, it can for example be removed either through a RF frequency synthesiser or baseband frequency estimation. Since signal bursts for PACS and the like standards are very short relative to channel variation, a quasi static channel approximation can be assumed. Such an assumption means that the channel is static during the burst period is realistically applied to a flat fading study. It should be appreciated that the assumption of a quasi-static channel is used through out this description and in the simulation work that follows.

Antenna Diversity Modes

Most PCS downlinks, including PACS, utilise continuous time division multiplex (TDM) transmission which is particularly known for the increase in transmission rate by time multiplexing data from a number of sources. A characteristic feature of TDM transmission is that, within a time frame, there are a number of extra time-slots in addition to the time-slot allotted to the burst which contains the wanted communication burst.

Referring to FIG. 2, each signal frame duration is 2.5 ms and comprises eight slots each of 312.5 $\mu$s duration. Each such 312.5 $\mu$s time slot is designated to transmit communication a data burst of 120 bits.

Thus, up to eight communication bursts, usually all originating from different sources, can be transmitted within a single frame. Assuming for convenience that burst B0 in the third time slot of the instant frame is the desired communication burst which is preceded by a plurality of un-wanted signal bursts, namely for example B3 & B4 from the previous frame and B2 & B1 from the present frame respectively, which precede the desired burst B0. It will become apparent below that these seemingly irrelevant data bursts, i.e. B1–B4, can be utilised to determine the channel and receiver parameters and set the diversity combining parameters $A_1$, $A_2$, $\theta$, i.e., the attenuation and the phase shifting factors in FIG. 1.

Upon determination of the parameters from the seemingly irrelevant bursts, the appropriate diversity modes, i.e. SD, EGC and IRC, which is anticipated to give the best reception according to some pre-determined criteria is to be selected and implemented for instantaneous reception of the desired burst. The manner how this is done is explained below.

In the description to follow, a general description of the various diversity algorithms which are applicable in a diversity receiver are discussed, the symbols $P_i$, $SQ_i$ and $\phi_i$ stand respectively for the received signal power, signal quality and carrier phase of the ith diversity branch.

Diversity Mode I: Selection Diversity (SD mode)

In this diversity mode, the receiver simply selects the diversity branch which has the best signal quality for demodulation. Selection of the diversity branch is usually based on a signal quality factor (SQ) which indicates the quality of the received signal with reference to the signal strength or eye-opening of the received signal. As eye-opening is widely accepted to be the more accurate indication of signal impairment, it will be used in the present embodiment.

In this mode, the SQ of the first and second diversity branches is determined independently and sequentially by any two preceding unwanted bursts, for example B2 & B1 above. The branch having the better SQ is selected for demodulating the subsequently arriving desired communication burst B0. The following provides an example of steps which could be used for independently obtaining the SQ and selecting the better antenna diversity branch in the SD mode.

Determining the SQ of first branch:

Firstly, the SQ of the first antenna branch, Ant.1, is determined by evaluating the preceding burst B2 which is received through Ant. 1. This is done by setting $A_1=1$ (0 dB attenuation), $A_2=0.1$ (20 dB attenuation) and $\theta=0°$ (no phase shit). The SQ of the first branch, $SQ_1$, as obtained from the received burst B2, is then calculated.

Determining the SQ of second branch:

Secondly, the SQ of the second antenna branch, Ant.2, is determined by evaluating another preceding burst B2 which is received through Ant.2. This is done by setting $A_1=0.1$ (−20 dB), $A_2=1$ (0 dB) and $\theta=0°$. The SQ of the second branch, $SQ_2$, as obtained from the received burst B1, is then calculated.

Communication burst reception:

After $SQ_1$ and $SQ_2$ has been determined, the antenna branch having the larger or better SQ is selected to receive and demodulate the desired burst, B0.

Diversity Mode 2: Equal-Gain Combining Mode (EGC mode)

Predictions and simulation results show that EGC provides performance advantage in a flat fading environment in which noise is the dominant and at a constant level. In this mode, the signals received by the two antenna are subject to equal amplification and the overall noise figure is reduced by having the phase of the signals from the two branches equalised before summing. EGC is useful for minimising noise figure in the present embodiment since attenuators rather than variable gain amplifiers are used. In this mode, the phase of the signals received via the two branches are first determined by utilising a number of unwanted bursts and their phases are then equalised by relative phase shifting. Since $A_1$ and $A_2$ can be set 0 dB, the key remaining process is then to have the signals in the two branches co-phased before combining.

Co-Phasing

Local crystal oscillators are known to have very high short-term stability. It can therefore be safely assumed that its frequency and phase remain constant during several bursts and can be used as a phase reference.

Firstly, Ant.2 is disconnected and Ant. 1 is selected to receive a preceding unwanted burst B2, and the phase $\Phi_1$ is recovered. Secondly, Ant.1 is disconnected and Ant. 2 is selected to receive another preceding unwanted burst B2 and phase $\Phi_2$ is recovered. Here, the phases $\Phi_1$ and $\Phi_2$ have an ambiguity equal to an integer multiple of 90 degrees introduced during the phase recovery process. This ambiguity causes no problems in coherent detection since it can be removed by deferential decoding. However, the absolute phase difference between the two branches are required if they are to be properly co-phased.

Now, let $\Phi=\Phi_1-\Phi_2$ (phase difference with ambiguity), and $\theta$ equals the true phase difference with no ambiguity. In other words, the exact phase difference $\theta$ equals to one of the values of $\Phi-180$, $\Phi-90$, $\Phi$ or $\Phi+90$. To remove the ambiguity, an additional burst B1 is employed. This burst B1 is divided into four equal periods during which the four possible phase values above are tested for combined signal power using RSSI circuit. The phase yielding the smallest power is then phase inverted (+180°) to yield co-phasing, since it is much easier to detect a minimum rather then to compare for a maximum.

Algorithm for Determining Phase Shift for Co-Phasing

The following provides an example of the steps which could be used as a reference to operate on the unwanted bursts B3–B1 for the co-phasing procedure.

B3: Firstly, Ant.1 is selected and Ant.2 substantially disconnected by setting $A_1=1$ (0 dB), $A_2=0.1$ (20 dB attenuation) and $\theta=0°$. $SQ_1$ and $\Phi_1$ are calculated from the unwanted burst B3.

B2: Secondly, Ant.2 is selected and Ant.1 substantially disconnected by setting $A_1=0.1$ (−20 dB), $A_2=1$ (0 dB) and $\theta=0°$. $SQ_2$ and $\Phi_2$ are calculated from the unwanted burst B2.

B1: Thirdly, during the 312.5 $\mu$s duration of burst B1, the four possible phase difference values, i.e. $\Phi-180$, $\Phi-90$, $\Phi$ and $\Phi+90$, are tested and the one which yields the smallest combined power after phase inversion (+180°) is then the exact phase difference which will be used to provide phase shifting in the second branch before the signals are combined.

B0: Finally, $A_1$ and $A_2$ are both set to 0 dB and the phase shift is set equal to $\theta$, the true phase difference. The desired communication burst B0 is then received and demodulated.

Diversity Mode 3: Interference-Reduction Combining

In a high capacity PCS, it is known that, for a given bandwidth, co-channel interference (CCI) limits system capacity. Usually, CCI is dominated by one co-channel interferer because of shadowing phenomenon, which is known to have a log-normally distributed local mean of received signal power. In order to cancel the primary source of CCI, it is preferable that the attenuating factors $A_1$ and $A_2$ are adjusted so that the interferences $I_1$ and $I_2$ from each of the branches are substantially equal in amplitude. The adverse effect of the interference can then be substantially eliminated or cancelled out by out of phase addition.

It is known, for example from the Cox and Wong paper, that Signal-to-Interference Ratio (SIR) and SQ are related. In particular, when SIR is between 7–13 dB, simulation has shown that there exists an approximate linear logarithmic relationship between SIR and SQ which is given by:

$$SIR(dB)=S/I\approx 4+38SQ(dB) \qquad \text{EQ. 1}$$

Now, since $$SIR_1 = \frac{S_1}{I_1}, P_1 = S_1 + I_1 = I_1(1 + SIR_1) \qquad \text{EQ.2}$$

$$SIR_2 = \frac{S_2}{I_2}, P_2 = S_2 + I_2 = I_1(1 + SIR_2) \qquad \text{EQ.3}$$

After the received signals have been attenuated, the post attenuation interference then becomes:

$$I'_1=A_1I_1, I'_2=A_2I_2 \qquad \text{EQ. 4}$$

In order to cancel the primary source of CCI, the post attenuation interferences $I'_1$ and $I'_2$ need to be equalised and then added out-of-phase. To make $I'_1$ equal to $I'_2$, the ratio, R, between the attenuator factors in the first and second antennas must be equal to the inverse of the ratio between the interfering power received through the first and second antennas. That is:

$$R = \frac{A_1}{A_2} = \frac{I_2}{I_1} = \frac{P_2(1+SIR_1)}{P_1(1+SIR_2)} \qquad \text{EQ.5}$$

The IRC algorithm comprises three major steps:—the initial step, optimising search, and coherent demodulation. The initial step provides a starting step for optimisation by estimating the attenuating factors $A_1$ and $A_2$ which will substantially equalise the interfering power by measuring the received power P and determining the signal quality $SQ_i$ of preceding bursts according to the above relationships. After the attenuation factors are determined, the necessary phase shifting required to attain optimum interference cancellation is determined according to EQ. 5. In the optimising search algorithm, further refinement of interference cancellation is searched for by varying the phase-shift in pre-defined steps to look for best results. After the optimum phase shift is identified, the desired burst B0 will then be demodulated.

The optimising search determines parameters for optimal interference reduction and tracks channel variation. Finally, coherent detection then recovers the received data and check the cyclic redundancy check (CRC) bits and co-channel interference control (CCIC) bits to determine the next operation. The following provides an example of the steps to be taken to implement the algorithm in the preferred receiver of the present example.

The Initial Step:

B4: Firstly, Ant.1 is selected and Ant.2 substantially disconnected by setting $A_1=1$ (0 dB), $A_2=1$ (−20 dB) and $\theta=0°$. $P_1$ and $SQ_1$ are then be determined from the received burst, B4, and the phase $\Phi_1$ is recovered.

B3: Secondly, Ant.2 is selected and Ant.1 substantially disconnected by setting $A_1=0.1$ (−20 dB), $A_2=1$ (0 dB) and $\theta=0°$. $P_2$ and $SQ_2$ are likewise determined from the received burst, B3, and the phase information, $\Phi_2$, is recovered. The value of the true phase difference, $\theta$, which would result in co-phasing of the signals, and therefore noise figure reduction, is then obtained by trying the values of $\Phi=|\Phi_1-\Phi_2|$ against the four possibilities mentioned in the EGC algorithm above.

B2: having determined the ratio, R, from the previous two bursts and using EQ 5, the signal received during this burst will be combined accordingly by setting the larger of $A_1$ and $A_2$ equal to 1 (i.e., 0 dB) so that the other attenuating factor will be a fraction of and not exceeding unity, thereby facilitating the use of attenuators only.

The Optimising Step:

B1: having combined the signals above with the amplitude ratio, R, the next step is to determine the relative phase-shift between the branches which will give the most favourable interference cancelling performance. In order to ascertain such a phase shift in a non-exhaustive manner to save time and power, the phase shifter is set to step through a combination of pre-defined discrete phase-offsets steps to locate the optimal phase shift. To expedite this search, the phase shift is confined to within 90 degrees of the initial phase shift. $\theta_0$, obtained above by first adjusting $\theta_1=\theta_0+45$ and $\theta_2=\theta_0-45$. This will give a good indication of which incremental phase shift direction would give a better factor, SQ, for the demodulated signal in order to determine the next search.

A Multi-diversity Receiver Algorithm

Figure 3:
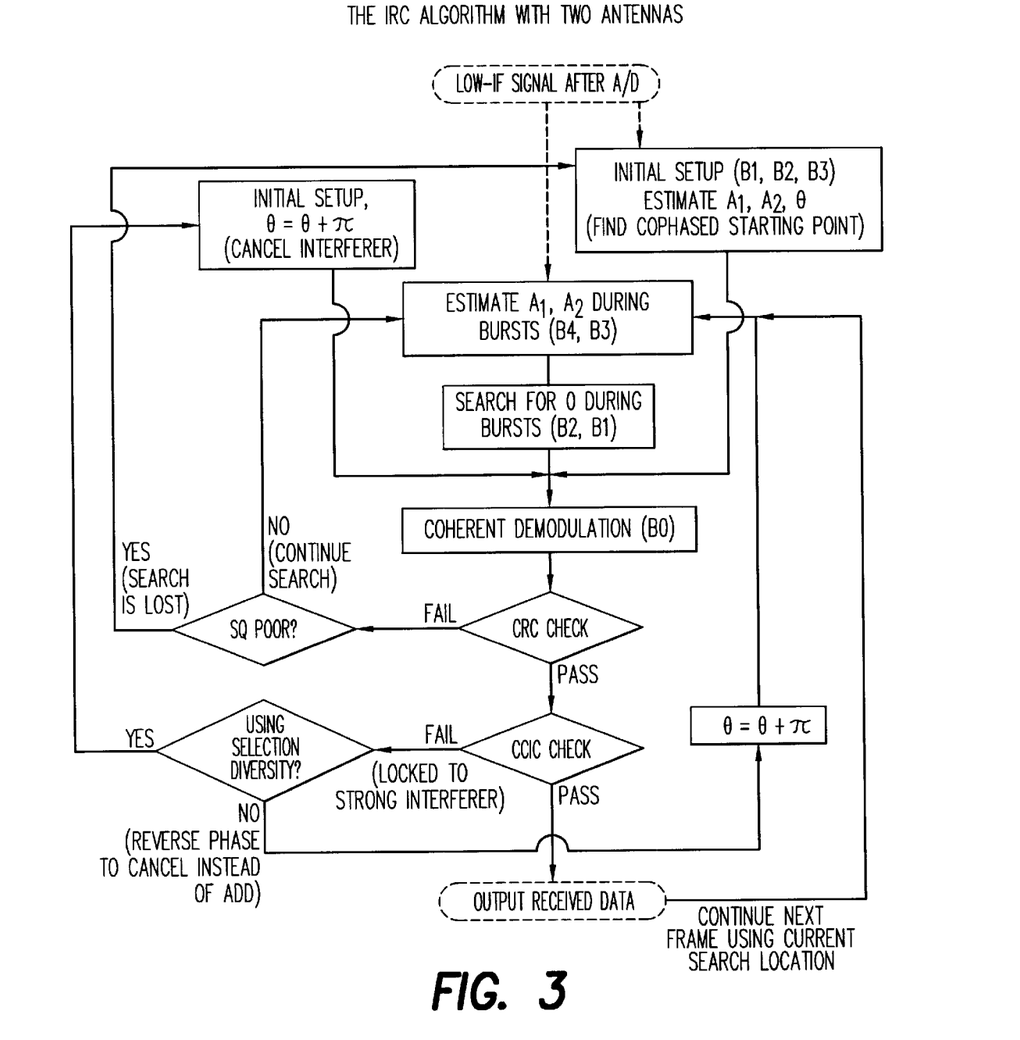
FIG. 3 shows a flowchart of a multi-diversity receiver algorithm with two antennas.

A preferred multi-diversity receiver algorithm comprising a plurality of diversity modes together with the criteria for selection thereof will now be explained in more detail, and with particular reference to FIG. 3.

This algorithm comprises three major steps: the characterising step determines the type of diversity to be adopted on the basis of measured SQ, the diversity optimisation step to optimise the receiver parameters and the demodulation step to demodulate the desired burst when certain signal quality indicia is met. The following provides an example of the steps to be taken to implement the algorithm in the preferred receiver of the present example.

The Initial Set-up:

B3: Firstly, Ant.1 is selected and Ant.2 substantially disconnected by setting $A_1=1$ (0 dB), $A_2=0.1$ (−20 dB) and $\theta=0°$. $P_1$ and $SQ_1$ are then be determined from the received burst, B3, and the phase $\Phi_1$ is recovered.

B2: Secondly, Ant.2 is selected and Ant.1 substantially disconnected by setting $A_1=0.1$ (−20 dB), $A_2=1$ (0 dB) and $\theta=0°$. $P_2$ and $SQ_2$ are likewise determined from the received burst, B2, and the phase information, $\Phi_2$, is recovered. The value of the true phase difference, $\theta$, which would result in co-phasing of the signals, and therefore noise figure reduction, is then obtained by trying the values of $\Phi=|\Phi_1-\Phi_2|$ against the four possibilities mentioned in the EGC algorithm above.

B1: having determined the ratio, R, from the previous two bursts and using EQ 5, the signal received during this burst will be combined accordingly by setting the larger of $A_1$ and $A_2$ equal to 1 (i.e., 0 dB) so that the other attenuating factor will be a fraction of and not exceeding unity, thereby facilitating the use of attenuators only.

The Diversity Optimization:

Having obtained the various channel characteristics from these preceding bursts, the signal quality factors obtained from the above steps are compared against a predefined signal quality threshold level, $SQ_{sd}$, above which selection diversity is to be used. If either $SQ_1$ or $SQ_2$ is above that threshold, reception is good and selection diversity can be adopted subsequently. If none of $SQ_1$ or $SQ_2$ is above the selection diversity threshold $SQ_{sd}$, an optimum combining algorithm will be activated and either an EGC or an IRC algorithm may be used to achieve optimum signal recovery. The demodulated signal thus obtained has to be satisfactorily tested against CRC and CCIC check, only if both tests are passed would the demodulated signal be accepted as a useful burst.

If the demodulated signal fails the CRC check and the SQ is below a minimum threshold level, $SQ_{min}$, the signal quality is too poor and this may indicate that the search is lost. If the CRC check fails but the SQ is above the minimum threshold level, the search will be continued in order to search for improved signal quality.

Where CRC check is passed but CCIC check fails, this means the receiver is locked to a stronger interferer. If this situation arises under selection diversity mode, the processor could then switch it into an IRC or an EGC mode by first going into the initial setup step to obtain the receiver characterising parameters. If the receiver is not under selection diversity, the phase will be inverted to cancel the stronger interferer, and the next frame is processed using the updated algorithm.

Figure 4:
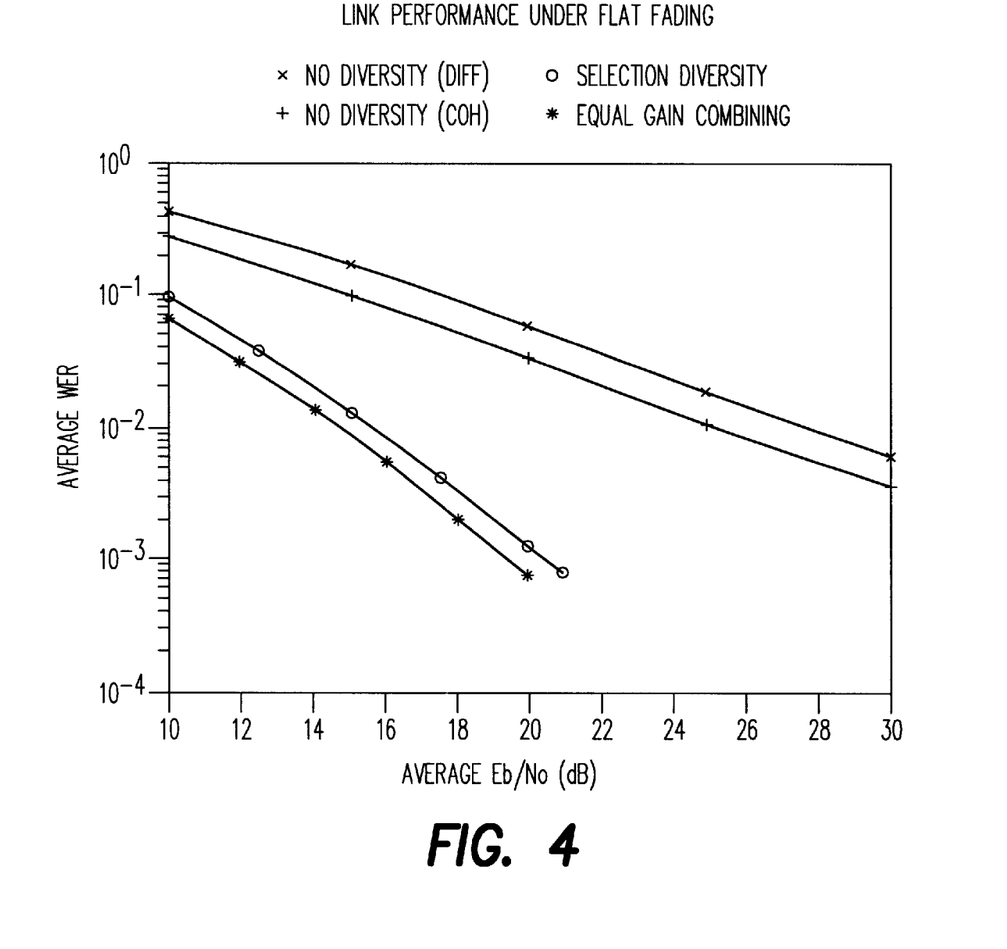
FIG. 4 shows the simulation results for link performance under flat fading.
Figure 5:
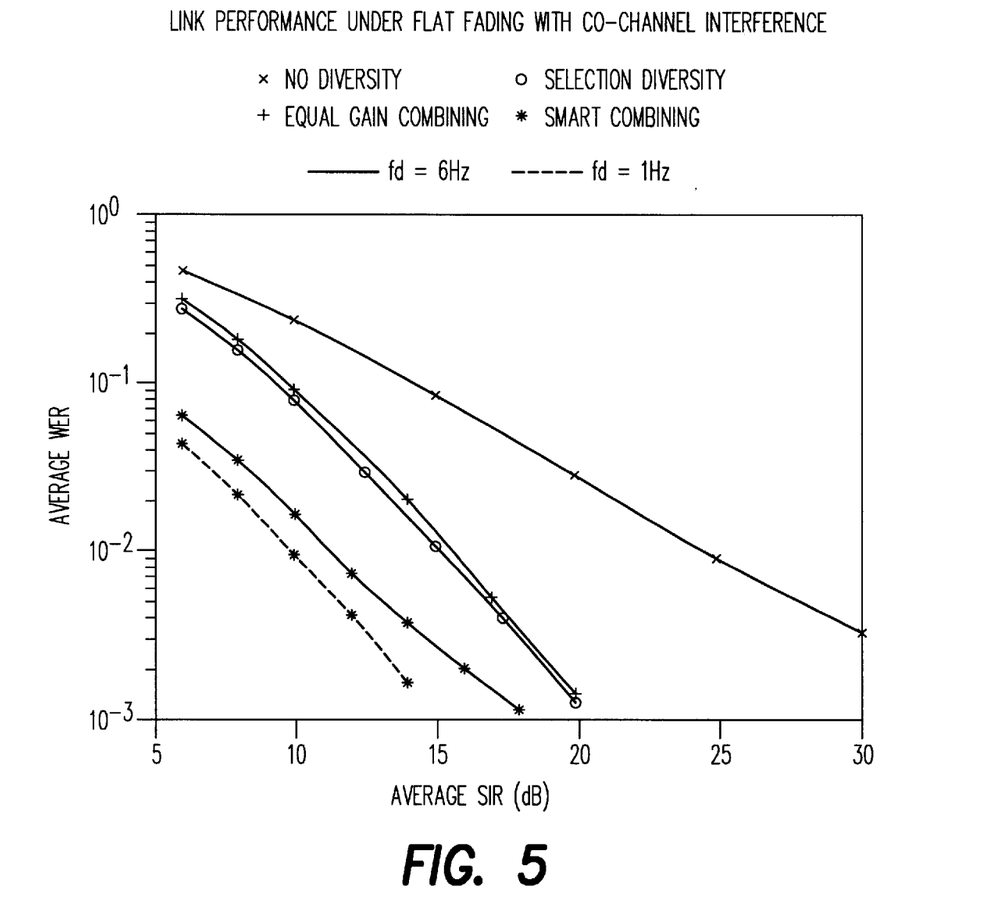
FIG. 5 shows the simulation results for link performance under flat fading with co-channel interference.
Figure 6:
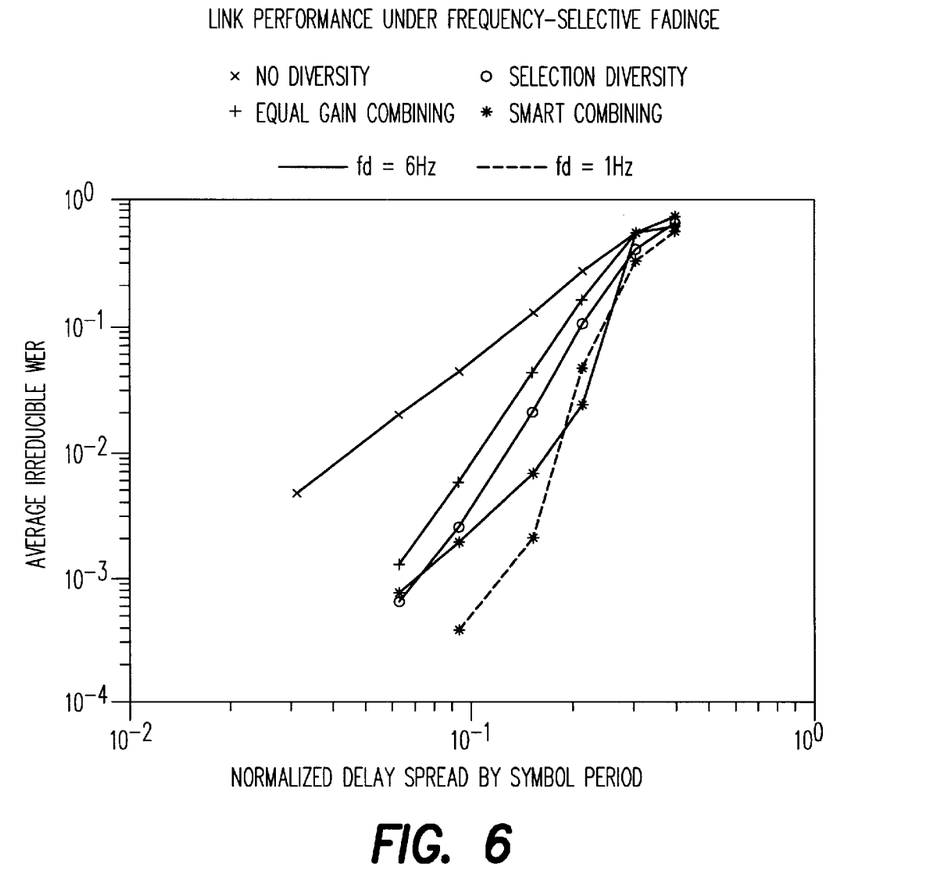
FIG. 6 shows the simulation results for link performance under frequency selective fading.

Simulation Results:

Performances of various combining diversity algorithms are simulated and the results are shown in FIGS. 4 to 6. In the simulations, the following conditions, in addition to those already described in the previous sections, are assumed.

Coherent or differential detection,

Jakes model is used for generating correlated slow Rayleigh fading channel,

A single dominant interferer is assumed in co-channel interference environment,

Delay spread effects are accounted for by using two-ray model.

Quantization is not considered but 40 dB SNR is used as a maximum noise margin.

The system is simulated with uniformly distributed symbol timing and a maximum Doppler shift of 6 Hz which corresponds to a walking speed of 2 mph at 2 GHz. RSSI and SQ provide a useful indicator of the channel conditions, and are used by the multi-diversity receiver to switch between the two combining algorithms automatically. Below a predefined threshold, the environment is noise limited and EGC is used. Otherwise the environment is assumed to be CCI-limited and IRC is employed.

As word error rate (WER), instead of bit error rate (BER), is a better performance indicator in a bursty error environment, all simulation results will therefore be given in WER.

Flat Fading Environment

Referring to FIG. 4. Coherent detection is used here since it achieves an improvement of about 2.5 dB over differential detection under no diversity. Under flat fading conditions, EGC is used since only programmable attenuators, instead of variable voltage amplifier, are used and noise is dominant and at a constant level. In such a case, $A_1=A_2=0$ dB yields the best noise figure and the two branches are co-phased before combining. The simulation results show that EGC provides a 1 dB improvement over SD at WER=0.01. The SD performance results closely agree with those predicted by other researchers.

Flat Fading with CCI Environment

FIG. 5 shows that in a CCI environment, the performance of SD and EGC are close and a substantial improvement of 4 dB over SD and EGC at a WER of 0.01 can be achieved by IRC at a Doppler frequency of 6 Hz. IRC is sensitive to Doppler shift because of the delay introduced by channel measure. When the Doppler frequency is 1 Hz, the SIR improvement increases to 5.5 dB above EGC performance.

Frequency Selective Fading Environment

Just as co-phasing is ineffective in dealing with CCI and delay spread, IRC is not suitable for dealing with multipath delay spread. The simulated results in FIG. 6 show the IRC's irreducible WER performance in frequency selective fading is better than SD and EGC. Normally, delay spread can be a significant factor even when signal power is high. Under such conditions, IRC is used, treating multipath as a variation of CCI.

While the present embodiment discloses a multi-diversity receiver topology having three inter-switchable diversity algorithms implemented on a single receiver, it should be appreciated that the present design is an extremely flexible design which can easily be converted into a receiver having any optional diversity schemes or a combination of a plurality of diversity schemes simply by necessary programming of the baseband processor shown in FIG. 1 and without appreciable change of the underlying hardware configuration.

What is claimed is:

1. A portable receiver for time division multiplexing access (TDMA) personal communication systems in which a wanted signal burst and a plurality of unwanted signal bursts are transmitted in a time-multiplexed manner in different respective time slots within the same signal frame comprising first and second antenna diversity branches, signal combining means, signal processing means and controlling means, wherein:

each said antenna diversity branch comprises a low-noise amplifier and means for signal amplitude variation and one of said diversity branches comprises phase shifting means;

said signal combining means is adapted to receive and combine the signal outputs from said first and second diversity branches, said signal processing means is adapted to process the signal output from said signal combining means, and said controlling means is adapted to control said means for signal amplitude variation and said means for adjusting phase shift, the amount of amplitude to be varied and the phase to be shifted being dependent on the signal quality (SQ) of unwanted signal bursts which were respectively received by said first and second diversity branches.

2. A portable receiver according to claim 1 wherein said signal quality is determined by the eye-opening of the received unwanted signal bursts.

3. A portable receiver according to claim 1 wherein said signal quality is determined by using a square-law symbol timing scheme.

4. A portable receiver according to claim 1 wherein said receiver comprises means to select a diversity scheme among a plurality of diversity schemes comprising selection diversity (SD), equal-gain combining (EGC) and interference-reduction combining (IRC) algorithms.

5. A portable receiver according to claim 4 wherein said receiver is programmed to select selection diversity when the signal quality (SQ) exceeds a pre-determined threshold value.

6. A portable receiver according to claim 4 wherein said receiver is programmed to select either equal-gain combining (EGC) or interference-reduction combining (IRC) when the signal quality (SQ) is below a first predetermined threshold value which represents good signal quality but above a second threshold value which represent poor signal quality.

7. A portable receiver according to claim 1 wherein said means for signal amplitude variation is a voltage controlled attenuator.

8. A portable receiver according to claim 1 wherein said means for adjusting phase shift is a voltage controlled phase shifter.

9. An algorithm for operating a multi-diversity receiver of claim 1 comprising:— determining the signal quality of said first and second diversity branches using unwanted signal bursts by firstly enabling said first and substantially disabling said second branch, measuring the first signal quality of the burst received by first branch, secondly by enabling said second branch and substantially disabling said first branch, measuring the second signal quality of the burst received by second branch;

comparing the signal qualities thus measured against a pre-determined threshold value, selecting selection diversity if either of said signal qualities exceeds said predetermined threshold value and selecting combining diversity if the signal qualities of the signals or their combination are below the predetermined threshold value but above a second predefined threshold value which corresponds to signal which are too poor for demodulation, and searching for better signal if the signal qualities of the signals and their combination are below the second predefined threshold value which corresponds to signal which are too poor for demodulation.

10. A portable receiver for time division multiplexing access (TDMA) personal communication systems in which a wanted signal burst and a plurality of unwanted signal bursts are transmitted in a time-multiplexed manner in different respective time slots within the same signal frame comprising first and second antenna diversity branches, signal combining means and signal processing means, wherein:

each said antenna diversity branch comprises a low-noise amplifier and means for signal amplitude variation and one of said diversity branches comprises phase shifting means;

said signal combining means is adapted to combine the signal outputs from said first and second diversity branches before said signal outputs have undergone any frequency conversion;

said signal processing means is adapted to process the signal output from said signal combining means; and controlling means adapted to control said means for signal amplitude variation and said means for adjusting phase shift, the amount of amplitude to be varied and the phase to be shifted being dependent on the signal quality (SQ) of unwanted signal bursts which were respectively received by said first and second diversity branches.

11. A portable receiver according to claim 10 wherein said signal quality is determined by the eye-opening of the received unwanted signal bursts.

12. A portable receiver according to claim 10 wherein said signal quality is determined by using a square-law symbol timing scheme.

13. A portable receiver according to claim 10 wherein said receiver comprises means to select a diversity scheme among a plurality of diversity schemes comprising selection diversity (SD), equal-gain combining (EGC) and interference-reduction combining (IRC) algorithms.

14. A portable receiver according to claim 13 wherein said receiver is programmed to select selection diversity when the signal quality (SQ) exceeds a pre-determined threshold value.

15. A portable receiver according to claim 14 wherein said receiver is programmed to select either equal-gain combining (EGC) or interference-reduction combining (IRC) when the signal quality (SQ) is below a first predetermined threshold value which represents good signal quality but above a second threshold value which represent poor signal quality.

16. An algorithm for operating an antenna diversity receiver comprising:

determining the signal quality of said first and second diversity branches using unwanted signal bursts which are intended for receivers other than said receiver by firstly enabling said first and substantially disabling said second branch, measuring the first signal quality of the unwanted signal burst received by first branch, secondly by enabling said second branch and substantially disabling said first branch, measuring the second signal quality of the unwanted signal burst received by second branch;

comparing the signal qualities thus measured against a pre-determined threshold value, selecting selection diversity if either of said signal qualities exceeds said threshold value and selecting combining diversity if the signal qualities of the signals or their combination are below the threshold value but above a second predefined threshold value which corresponds to signal which are too poor for demodulation, and searching for better signal if the signal qualities of the signals and their combination are below the threshold value which corresponds to signal which are too poor for demodulation.

* * * * *